Figure 1:
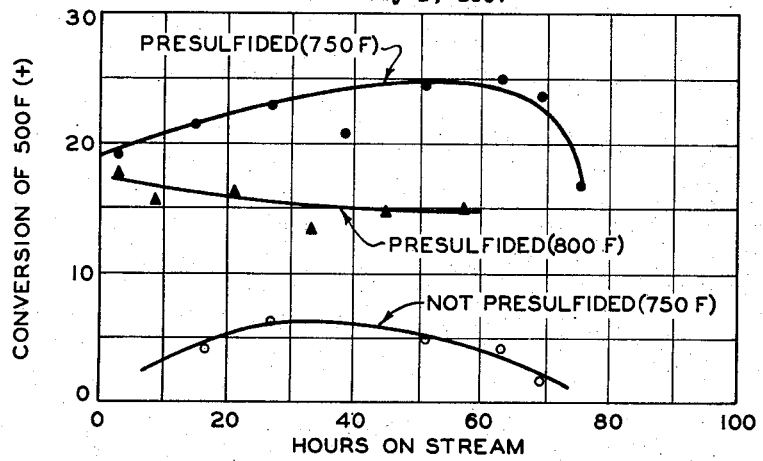

INVENTORS
L. E. GARDNER
R. J. HOGAN

BY *Hudson & Young*

ATTORNEYS

United States Patent Office 2,946,738
Patented July 26, 1960

2,946,738

HYDROCRACKING A GAS OIL WITH A PRESULFIDED CATALYST CONSISTING OF OXIDES OF VANADIUM, COBALT AND MOLYBDENUM ON GAMMA ALUMINA

Lloyd E. Gardner and Robert J. Hogan, Bartlesville, Okla., assignors to Phillips Petroleum Company, a corporation of Delaware Filed July 1, 1957, Ser. No. 669,350

18 Claims. (Cl. 208—112)

This invention relates to an improved hydrocarbon conversion catalyst.

A specific aspect of the invention is concerned with a method of preparing an improved hydrocarbon conversion catalyst particularly suited to the hydrocracking of heavy gas oils.

In the hydrocracking of gas oils, one of the problems involved is that of developing a catalyst of high cracking activity and low coke laydown characteristics. Generally a catalyst of high cracking activity effects a substantial amount of conversion to coke. In the hydrocracking of gas oil, it is desirable to convert a substantial amount of the feed to olefins and avoid hydrogenation of the olefins to saturated hydrocarbons. It is also desirable that the catalyst have good desulfurization activity along with high cracking activity and low conversion to coke. We have developed a catalyst and a method of preparing the same which has improved charactistics in the hydrocracking of heavy gas oils.

It is an object of our invention to provide an improved catalyst and process for preparing the same. Another object is to provide an improved hydrocracking catalyst which has high cracking and desulfurization activity with low conversion to coke. A further object is to provide an improved process for the conversion of hydrocarbon to more valuable fluid hydrocarbons. It is also an object of the invention to provide an improved process for hydrocracking a heavy gas oil. Other objects of the invention will become apparent from a consideration of the accompanying disclosure.

Our improved catalyst comprises cobalt molybdate on vanadia-alumina, which has been pretreated with hydrogen sulfide. This catalyst when made in accordance with the process of the invention has increased cracking activity, low coke laydown, and good desulfurization activity at mild hydrocracking conditions. Our catalyst is also unique in that a substantial proportion of the olefins produced by cracking of the gas-oil components are not hydrogenated, although good desulfurization activity is maintained during the hydrocracking. The catalyst comprises a porous active gamma-alumina support or base having dispersed thereon the oxides of vanadium, cobalt, and molybedenum. The composite is pretreated by partially reducing the oxides and sulfiding the partially reduced composite. The amount of the vanadium, cobalt, and molybdenum in the catalyst may range from 1 to 10 percent, calculated as metal, the balance being alumina; however, it is preferred that the vanadium be in the range of 2 to 3 weight percent of the catalyst, the cobalt in the range of 2 to 4 weight percent, and the molybdenum in the range of 3 to 6 percent.

In preparing the catalysts of the invention, an active porous aluminum oxide having substantial pore volume is impregnated with an aqueous solution of ammonium vanadate followed by draining, drying, and calcining the impregnated support; thereafter the calcined deposit is impregnated with a solution of a mixture of cobalt nitrate and ammonium molybdate. (This solution may be prepared as described in U.S. Patent 2,486,361). The impregnated vanadia-alumina is drained, dried, and calcined so as to convert the metal compounds to oxides. The calcined composite containing cobalt and molybdenum oxides on vanadia-alumina is then partially reduced by treatment with hydrogen at an elevated temperature and the partially reduced composite is sulfided, preferably by contacting the same with hydrogen sulfide at a temperature in the range of about 600 to 900° F. or higher. A preferred method is to reduce the composite in hydrogen at a temperature in the range of 600 to 1100° F. and thereafter subject the reduced composite to contact with hydrogen sulfide admixed with hydrogen at an elevated sulfiding temperature. It is also feasible to simultaneously contact the mixed oxides composite with a mixture of hydrogen and hydrogen sulfide under reducing and sulfiding conditions, particularly at a temperature in the range of 600 to 900° F.

A preferred method of sulfiding comprises passing a gas containing from 5 to 10 volume percent of hydrogen sulfide and 95 to 90 volume percent hydrogen through the particulate catalyst at a temperature in the range of 600 to 900° F. at moderate superatmospheric pressure and at a space velocity between 5 and 500 and even higher volumes of gas per volume of catalyst per hour. About 100 to 500 volumes of gas per volume of catalyst is sufficient to adequately activate the catalyst. The hydrogen sulfide treatment is continued until this gas appears in the off-gas. The appearance of hydrogen sulfide in the off-gas may be determined by passing the off-gas through a bubble bottle charged with a solution of cadmium chloride to which has been added a small amount of sodium hydroxide.

Various types of active alumina from a number of sources may be used for the alumina base of the catalyst. Synthetic alumina gel, partially dehydrated naturally occurring hydrous alumina, as well as precipitated alumina trihydrate properly dehydrated so as to maintain the alumina, at least in part, in the gamma form may be used as the support for the other constituents of the catalyst.

It is also feasible to impregnate the alumina base in a variety of ways other than the manner specifically described herein. The impregnation may be effected from a solution containing all three added metal compound promoters, such as from an aqueous solution of ammonium vanadate, ammonium molybdate, and cobalt nitrate; or the impregnation may be by successive impregnation with separate individual solutions of the three metal compounds followed by calcination after each impregnation. Another variation comprises successive impregnations of vanadia-alumina with an aqueous solution of the other two compounds, such as ammonium molybdate and cobalt nitrate, with calcination of the composite between impregnations. Or the alumina support may be impregnated by soaking same in or with a solution of all three metal compounds followed by calcination and repeating the soaking and calcination steps one or more times to obtain the desired concentration of the metals on the support.

The reduction of the mixed oxides in $H_2$ at elevated temperatures (600–1100° F.) reduces the vanadium and molybdenum oxides to the lower oxide forms and reduces most of the cobalt oxide to the metal. The sulfiding treatment with $H_2S$ produces an effective amount of metal sulfide in the catalyst but the exact form of the sulfided composite is not known. Hence the terms "reducing" and "sulfiding" as used herein are to be interpreted in this light and anyone familiar with the catalyst art will understand what is meant by a "reduced and sulfided mixed oxides" comprosite catalyst. This sulfided catalyst is an improved catalyst for hydrocracking of heavy gas oils. Increased cracking activity and low coke laydown is maintained using this catalyst at mild hydrocracking conditions. The range of operating conditions for hydrocracking using this catalyst are:

|  | Preferred | Broad |
|---|---|---|
| Temperature, °F | 725–775 | 700–800 |
| Pressure, p.s.i.g. | 250–750 | 100–1,000 |
| LHSV | 0.5–2.0 | 0.1–10 |
| Cu. ft.H₂/bbl. oil | 500–2,000 | 100–10,000 |

Gas oils having a boiling range of 350 to 1100° F. are suitable feeds for the hydrocracking catalyst of the invention. Such feeds usually contain up to about three weight percent sulfur.

Figure 2:
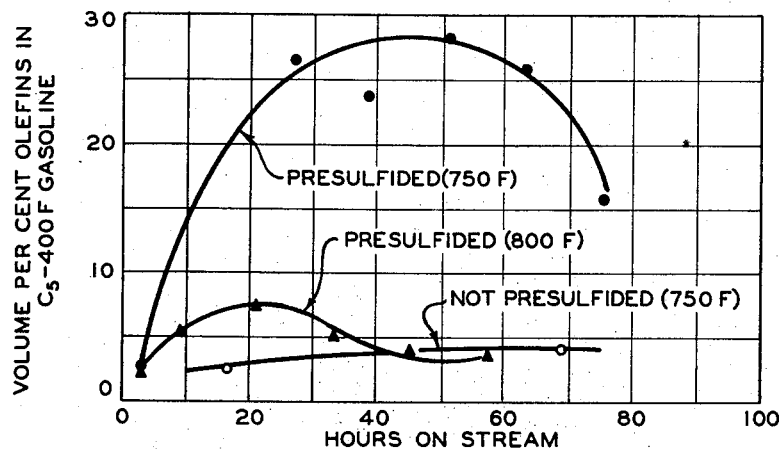
Figure 3:
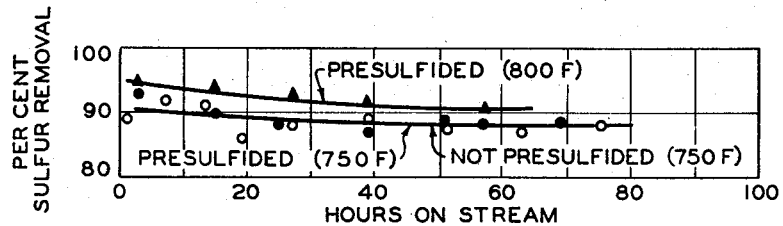

In the drawing, Figure 1 is a graph showing the effect of temperature and of presulfiding of the catalyst of the invention on conversion of gas oil; Figure 2 is a graph showing a comparison of the volume percent of olefins in the $C_5$–400° F. gasoline fraction of a conversion effluent from hydrocracking a gas oil with the presulfided catalyst of the invention and with a non-presulfided catalyst of corresponding composition; and Figure 3 is a graph showing the percent of sulfur removal from a gas-oil feed by a presulfided catalyst and one of corresponding composition not presulfided.

The following specific examples are presented to illustrate the invention but are not to be construed as unnecessarily limiting the same.

EXAMPLE I.—PREPARATION OF THE CATALYST

Active aluminum oxide obtained from Harshaw Chemical Company was dried at 1000° F. and used as the base. The pore volume of the aluminum oxide was 40 cc. per 100 grams. Twenty-eight and four tenths grams of ammonium vanadate ($NH_4VO_3$) was dissolved in 250 ml. water. One hundred eighty grams of dried aluminum oxide was impregnated with this ammonium vanadate solution. The aluminum oxide was drained free of the solution and dried at about 230° F. The dried material was calcined at 1000° F. to convert the ammonium vanadate to vanadium oxide. A 250 ml. solution containing 69.3 grams cobalt nitrate

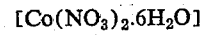
[$Co(NO_3)_2 \cdot 6H_2O$]

and 41.5 grams of ammonium molybdate

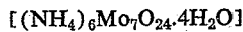
[$(NH_4)_6Mo_7O_{24} \cdot 4H_2O$]

was prepared as described in U.S. Patent 2,486,361. The vanadia-alumina was impregnated with this solution. The vanadia-alumina was drained free of the solution and dried at about 230° F. The dried material was calcined at 1000° F. to convert the cobalt and molybdenum compounds to the oxides.

Two batches were prepared according to this procedure. Batch No. 1 analyzed 2 weight percent cobalt, 3 weight percent molybdenum and 2 weight percent vanadium on the alumina. Batch No. 2 analyzed 3.6 weight percent cobalt, 5.1 weight percent molybdenum and 2.4 weight percent vanadium on the alumina. The surface area of batch No. 1 was 208 sq. meters per gram and of batch No. 2 was 171 sq. meters per gram.

These catalysts were reduced in one atmosphere hydrogen at 850° F. followed by pre-sulfiding in one atmosphere of hydrogen-hydrogen sulfide containing 5 to 10 volume percent hydrogen sulfide. Approximately 100 to 500 volume of gas was required per volume of catalyst.

EXAMPLE II.—HYDROCRACKING OF GAS OIL

A Wafra gas oil, boiling range 350 to 1050° F., API of 28.5, 2.17 weight percent sulfur and 0.1 weight percent nitrogen was hydrocracked under conditions of 750° F., 500 p.s.i.g., 1 LHSV, and 1000 cu. ft. $H_2$ per bbl. oil, using batch No. 1 of the catalyst prepared as described in Example I.

Comparisons of the cracking activities of the catalyst of Example I with cobalt molybdate alumina and with vanadia on alumina are shown in Table I. The cobalt molybdate catalyst is a commercially available catalyst used by a number of oil companies in large scale hydrotreating. It contained 1.6 percent Co and 5.5 percent Mo (by weight) and the balance active alumina and had a surface area of 167 sq. m./g. The vanadia on alumina catalyst had a surface area of 177 sq. m./g. and contained 6.4 weight percent vanadium, the balance being active alumina. It was made by impregnating the porous alumina support with ammonium vanadate dissolved in aqueous ethanolamine solution followed by calcination at 1000° F.

Table I
FRACTIONATION OF LIQUID PRODUCTS

| Weight percent to— | Charge Oil | Cobalt Molybdate on Alumina | Vanadia on Alumina | Catalyst of Example I |
|---|---|---|---|---|
| C₄'s and lighter | 0.4 | 0.0 | 0.4 | 0.9 |
| C₅ to 400° F | 9.4 | 6.6 | 10.0 | 27.8 |
| 400 F.+ | 90.2 | 93.4 | 89.6 | 71.3 |

The mass spectroanalysis of the reactor gaseous effluent is given in Table II.

Table II

| Composition, Mol percent | CoMoO₄ on Alumina | V₂O₅ on Alumina | Catalyst of Example I |
|---|---|---|---|
| H₂ | 92.6 | 95.9 | 83.7 |
| H₂S | 4.6 | 2.1 | 3.1 |
| Paraffins—C₅'s and lighter | 2.7 | 2.0 | 10.8 |
| Olefins—C₅'s and lighter | 0.1 | 0.0 | 2.4 |

Desulfurization activities of the catalysts were: cobalt molybdate on alumina—90 percent; vanadia on alumina—60 percent and the catalyst of this invention—70 percent. Coke laydown on the catalyst were low for all three catalysts.

EXAMPLE III.—EFFECT OF TEMPERATURE AND OF PRESULFIDING

A Wafra gas oil, boiling range 350 to 1100° F., API of 28.5, 2.17 weight percent sulfur was hydrocracked under conditions of 750° F. and 800° F., 500 p.s.i.g., 1 LHSV and 1000 cu. ft. $H_2$ per bbl. oil using batch No. 2 of the catalyst prepared as described in Example I. The effect of temperature and of presulfiding on conversion is shown in Table III and plotted in Figure 1.

Table III
CONVERSION OF 500° F. (+)

| Hours on Stream | Not Presulfided Catalyst run at 750° F. | Presulfided Catalyst run at 750° F. | Presulfided Catalyst run at 800° F. |
|---|---|---|---|
| 0–6 | | 19.1 | 18.0 |
| 6–12 | | | 15.6 |
| 12–18 | | 21.5 | |
| 15–18 | 4.4 | | |
| 18–24 | | | 16.3 |
| 24–30 | 6.4 | 23.0 | |
| 30–36 | | | 13.4 |
| 36–42 | | 21.1 | |
| 42–48 | | | 14.8 |
| 48–54 | 5.0 | 24.7 | |
| 54–60 | | | 15.0 |
| 60–66 | 4.2 | 25.0 | |
| 66–72 | 1.9 | 23.8 | |
| 72–78 | | 16.8 | |

The volume percent olefins in the $C_5$–400° F. gasoline fraction are given in Table IV and plotted in Figure 2.

Table IV
VOLUME PERCENT OLEFINS IN C₅-400° F. GASOLINE

| Hours on Stream | Not Presulfided Catalyst run at 750° F. | Presulfided Catalyst | |
|---|---|---|---|
| | | run at 750° F. | run at 800° F. |
| 0-6 | | 2.9 | 2.6 |
| 6-12 | | | 5.5 |
| 15-18 | 2.8 | | |
| 18-24 | | | 7.6 |
| 24-30 | | 26.5 | |
| 30-36 | | | 5.0 |
| 36-42 | | 23.8 | |
| 42-48 | | | 4.0 |
| 48-54 | | 28.1 | |
| 54-60 | | | 3.9 |
| 60-66 | | 25.9 | |
| 66-72 | 4.1 | | |
| 72-78 | | 15.8 | |

The percent sulfur removal from the oil feed are given in Table V and plotted in Figure 3.

Table V
SULFUR REMOVAL

| Hours on Stream | Not Presulfided Catalyst run at 750° F. | Presulfided Catalyst | |
|---|---|---|---|
| | | run at 750° F. | run at 800° F. |
| 0-6 | | 93 | 95 |
| 3-6 | 89 | | |
| 6-9 | 92 | | |
| 12-15 | 91 | | |
| 12-18 | | 90 | 94 |
| 18-21 | 86 | | |
| 24-30 | 88 | 88 | 93 |
| 36-42 | 89 | 87 | 92 |
| 48-54 | 88 | 89 | |
| 54-60 | | 88 | 91 |
| 60-66 | 87 | | |
| 66-72 | | 88 | |
| 72-78 | 88 | | |

Certain modifications of the invention will become apparent to those skilled in the art and the illustrative details disclosed are not to be construed as imposing unnecessary limitations on the invention.

We claim:

1. A catalyst consisting essentially of a reduced and sulfided mixture of the oxides of vanadium, cobalt, and molybdenum containing metal sulfides deposited on porous active alumina.

2. A catalyst of the composition of claim 1 having been activated by treatment with a reducing and sulfiding gas at an elevated temperature above 600° F.

3. A catalyst of the composition of claim 1 having been activated by treatment with an H₂S-containing gas at a temperature in the range of 600 to 900° F.

4. A catalyst of the composition of claim 1 wherein the range of each of Co, Mo, and V is 1 to 10 percent by weight of the catalyst and the balance comprises gamma alumina.

5. A catalyst of the composition of claim 4 having been sulfided by contacting same with a stream of H₂S at a temperature in the range of 600 to 900° F. until H₂S appears in the off-gas.

6. A catalyst consisting essentially of an active gamma alumina support impregnated with the oxides of vanadium, cobalt, and molybdenum, the vanadium being in the range of 2 to 3 weight percent, the cobalt 2 to 4 weight percent, and the molybdenum 3 to 6 weight percent, subjected to reduction in H₂ and sulfiding in H₂S at temperatures above 600° F. to leave metal sulfides in the catalyst.

7. A catalyst of the composition of claim 6 having been reduced with hydrogen at a temperature in the range of 600 to 1100° F. and thereafter sulfided in H₂S at a temperature in the range of 600 to 900° F.

8. A process for preparing a catalyst comprising impregnating a porous active alumina support with aqueous solution of compounds, convertible to the oxide form by calcination, of the metals cobalt, molybdenum, and vanadium so as to deposit in the support an amount of each said metal in the range of 1 to 10 weight percent; drying the support, and calcining same so as to convert the metal compound to metal oxide; heating the resulting metal oxide composite in a hydrogen ambient to a reducing temperature; and thereafter sulfiding the resulting composite.

9. The process of claim 8 wherein the sulfiding step is effected by contacting said resulting composite with H₂S at a temperature in the range of 600 to 900° F.

10. The process of claim 9 wherein the sulfiding gas comprises hydrogen containing H₂S in the range of 5 to 10 volume percent.

11. A process for preparing a catalyst comprising impregnating porous active alumina particles with an aqueous solution of ammonium vanadate; calcining the impregnated alumina so as to convert the vanadium to the oxide form; thereafter impregnating the calcined composite with aqueous solution of cobalt nitrate and ammonium molybdate; calcining the resulting impregnated composite so as to convert the cobalt and molybdenum to the oxide form; thereafter reducing and sulfiding the resulting composite to leave metal sulfides in the catalyst.

12. The process of claim 11 wherein the reducing step is effected in hydrogen at a temperature above 600° F.

13. The process of claim 12 wherein the reduced composite is sulfided by contacting same with an H₂S-containing gas at a temperature in the range of 600 to 900° F.

14. The process of claim 11 wherein the reducing and sulfiding steps are effected by contacting the composite at a temperature above 600° F. with a mixture of hydrogen and H₂S.

15. A process for the hydrocracking of fluid hydrocarbons boiling in the range of about 350 to 1100° F. to more valuable hydrocarbons which comprises contacting a fluid hydrocarbon feed in admixture with hydrogen with a catalyst consisting essentially of porous active alumina in major proportion admixed with a reduced and sulfided mixture of the oxides of vanadium, cobalt, and molybdenum under hydrocracking conditions.

16. A process for hydrocracking a gas oil boiling in the range of about 350 to 1100° F. which comprises contacting said gas oil admixed with hydrogen under hydrocracking conditions including a temperature in the range of 700 to 800° F. with a catalyst consisting essentially of porous active alumina having deposited thereon a reduced, sulfided mixture of the oxides of vanadium, cobalt, and molybdenum.

17. The process of claim 16 wherein said catalyst contains from 1 to 10 weight percent of each of the metals V, Co, and Mo.

18. The process of claim 17 wherein said hydrocracking conditions include a temperature in the range of 725 to 775° F., pressure in the range of 100 to 1000 p.s.i.g., at least 100 s.c.f. of H₂ per bbl. of liquid feed, and 0.5 to 2.0 LH space velocity.

References Cited in the file of this patent

UNITED STATES PATENTS

| | | |
|---|---|---|
| 2,365,029 | Voorhies | Dec. 12, 1944 |
| 2,428,692 | Voorhies | Oct. 7, 1947 |
| 2,487,466 | Nahin | Nov. 8, 1949 |
| 2,656,302 | Porter et al. | Oct. 20, 1953 |
| 2,687,983 | Garwood | Aug. 31, 1954 |
| 2,761,815 | Hutchings | Sept. 4, 1956 |
| 2,761,817 | Sweetser et al. | Sept. 4, 1956 |
| 2,769,756 | Porter et al. | Nov. 6, 1956 |
| 2,793,170 | Stiles et al. | May 21, 1957 |
| 2,804,426 | Askey | Aug. 27, 1957 |